(12) United States Patent
Baughman et al.

(10) Patent No.: US 12,579,181 B2
(45) Date of Patent: Mar. 17, 2026

(54) SYNCHRONIZATION OF SENSOR NETWORK WITH ORGANIZATION ONTOLOGY HIERARCHY

(71) Applicant: International Business Machines Corporation, Armonk, NY (US)

(72) Inventors: Aaron K. Baughman, Cary, NC (US); Sarbajit K. Rakshit, Kolkata (IN); Gray Franklin Cannon, Atlanta, GA (US); Eduardo Morales, Key Biscayne, FL (US)

(73) Assignee: International Business Machines Corporation, Armonk, NY (US)

( * ) Notice: Subject to any disclaimer, the term of this patent is extended or adjusted under 35 U.S.C. 154(b) by 191 days.

(21) Appl. No.: 18/514,240

(22) Filed: Nov. 20, 2023

(65) Prior Publication Data

US 2025/0165518 A1     May 22, 2025

(51) Int. Cl.
*G06F 16/25*          (2019.01)
*G06F 16/36*          (2019.01)
(Continued)

(52) U.S. Cl.
CPC ............ *G06F 16/367* (2019.01); *G06F 40/40* (2020.01)

(58) Field of Classification Search
CPC ...... G06F 16/367; G06F 16/23; G06F 16/245; G06F 16/288; G06F 16/8373;
(Continued)

(56) References Cited

U.S. PATENT DOCUMENTS 8,676,833 B2    3/2014  Chunilal
8,793,790 B2    7/2014  Khurana et al.
(Continued)

FOREIGN PATENT DOCUMENTS

EP          1876089 B1    2/2012

OTHER PUBLICATIONS

Detoni, Archimedes et al., "Exploring the Role of Enterprise Architecture Models in the Modularization of an Ontology Network: A Case in the Public Security Domain", 2017 IEEE 21st International Enterprise Distributed Object Computing Workshop, Oct. 10-13, 2017, 10 pages.
(Continued)

*Primary Examiner* — Olujimi A Adesanya
(74) *Attorney, Agent, or Firm* — CHIP LAW GROUP

(57)          ABSTRACT

Mechanisms are provided for synchronizing a sensor network with an organization ontology hierarchy. The ontology data structure comprises a plurality of nodes specifying concepts associated with operations of the organization, and edges connection nodes that represent relationships between the connected nodes. The sensor network comprises elements representing sensors deployed to an infrastructure of the organization. Natural language processing is performed on textual data associated with nodes of the ontology data structure and elements of the sensor network. Sensors of the sensor network are mapped to corresponding nodes in the ontology data structure based on results of the natural language processing. At least one of the sensor network or
(Continued)

the ontology data structure are modified to align and synchronize the sensor network with the ontology data structure.

16 Claims, 4 Drawing Sheets

(51) Int. Cl.
| | |
|---|---|
| *G06F 16/532* | (2019.01) |
| *G06F 16/901* | (2019.01) |
| *G06F 40/40* | (2020.01) |

(58) Field of Classification Search
CPC .. G06F 16/9024; G06F 16/901; G06F 16/907; G06F 16/9027; G06F 16/90335; G06F 40/30; G06F 40/40; G06F 40/205; G06F 40/295; G06F 16/958
See application file for complete search history.

(56) References Cited

U.S. PATENT DOCUMENTS

| | | | | |
|---|---|---|---|---|
| 9,672,273 | B2 * | 6/2017 | Kapoor | G06F 16/288 |
| 11,222,077 | B1 | 1/2022 | Martin et al. | |
| 2010/0177750 | A1 * | 7/2010 | Essinger | H04L 67/12 |
| | | | | 345/522 |
| 2012/0154633 | A1 | 6/2012 | Rodriguez | |
| 2013/0124574 | A1 * | 5/2013 | Brettin | G16B 50/20 |
| | | | | 707/798 |
| 2014/0379755 | A1 | 12/2014 | Kuriakose et al. | |
| 2018/0137858 | A1 * | 5/2018 | Saxena | H04L 12/2816 |
| 2018/0239507 | A1 | 8/2018 | Bui et al. | |
| 2019/0287006 | A1 * | 9/2019 | Costabello | G06N 5/045 |
| 2020/0089251 | A1 * | 3/2020 | Golestan Irani | G06F 3/167 |
| 2021/0209144 | A1 * | 7/2021 | Trim | G06F 16/367 |
| 2022/0019742 | A1 * | 1/2022 | Bhamidipaty | G06N 5/022 |
| 2022/0093279 | A1 * | 3/2022 | Marinescu | G06N 5/02 |
| 2023/0273943 | A1 * | 8/2023 | Baughman | G06F 16/3329 |
| | | | | 704/9 |

OTHER PUBLICATIONS

Globa, Larysa et al., "Examples of Ontology Model Usage in Engineering Fields", Ontology in Information Science, Chapter Metrics Overview, Feb. 20, 2018, 35 pages.

Huang, Maojun, "On The Concept of Geographic Ontology—From The Viewpoints of Philosophy Ontology, Information Ontology and Spatial Ontology", 2010 18th International Conference on Geoinformatics, Jun. 18-20, 2010, 5 pages.

Kiong, Yip Chi et al., "Health Ontology System", 2011 7th International Conference on IT in Asia (CITA), Jul. 12-13, 2011, 4 pages.

Lin, Szu-Yin et al., "Dynamic Data Driven-based Automatic Clustering and Semantic Annotation for Internet of Things Sensor Data", Sensors and Materials, vol. 31, No. 6 (2019) 1789-1801, Jun. 7, 2019, 13 pages.

Liu, Jin et al., "Towards Semantic Sensor Data: An Ontology Approach", Sensors 2019, 19, 1193, Mar. 8, 2019, 21 pages.

Quoc, Hoan N et al., "EAGLE—A Scalable Query Processing Engine for Linked Sensor Data", Sensors 2019, 19, 4362, Oct. 9, 2019, 42 pages.

Schlenoff, Craig et al., "An IEEE Standard Ontology for Robotics and Automation", 2012 IEEE/RSJ International Conference on Intelligent Robots and Systems, Oct. 7-12, 2012, 6 pages.

Takes, Frank W. et al., "Mining User-generated Path Traversal Patterns in an Information Network", 2013 IEEE/WIC/ACM International Conferences on Web Intelligence (WI) and Intelligent Agent Technology (IAT), Nov. 17-20, 2013, 6 pages.

Van Den Berg, Line et al., "Agent Ontology Alignment Repair through Dynamic Epistemic Logic", Proceedings of the 19th International Conference on Autonomous Agents and Multiagent Systems (AAMAS 2020), May 9-13, 2020, 9 pages.

Wang, Zhiqiang et al., "Multi-point traversal path planning of manipulator based on improved RRT algorithm", Proceedings of the 2019 International Conference on Robotics, Intelligent Control and Artificial Intelligence (RICAI '19), Sep. 20-22, 2019, 6 pages.

Yu, Yunqian et al., "Optimal search mapping among sensors in heterogeneous smart homes", AIMS, Mathematical Biosciences and Engineering (2022), Nov. 9, 2022, 21 pages.

* cited by examiner

100

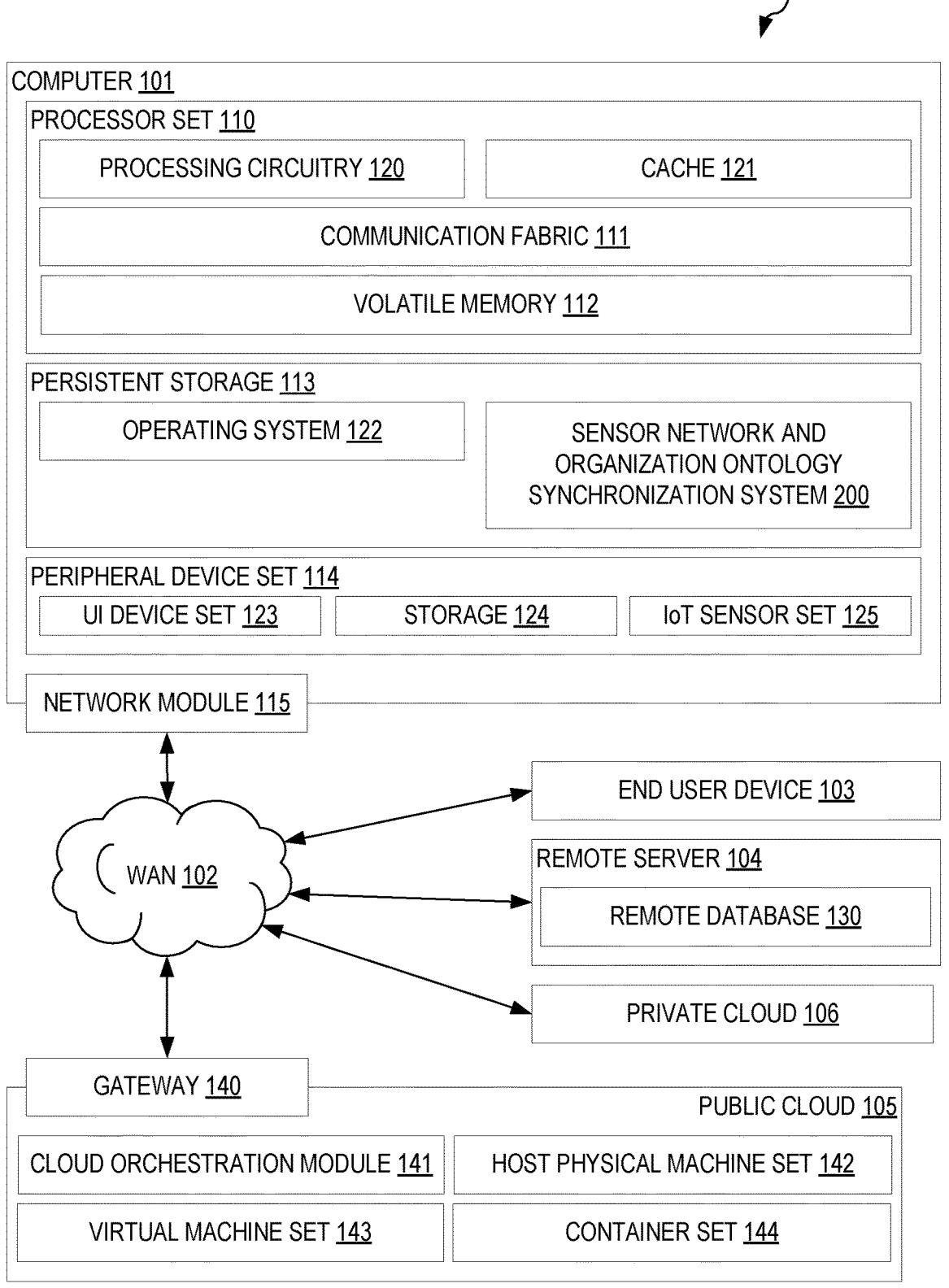

COMPUTER 101

PROCESSOR SET 110

PROCESSING CIRCUITRY 120     CACHE 121

COMMUNICATION FABRIC 111

VOLATILE MEMORY 112

PERSISTENT STORAGE 113

OPERATING SYSTEM 122     SENSOR NETWORK AND ORGANIZATION ONTOLOGY SYNCHRONIZATION SYSTEM 200

PERIPHERAL DEVICE SET 114

UI DEVICE SET 123     STORAGE 124     IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141     HOST PHYSICAL MACHINE SET 142

VIRTUAL MACHINE SET 143     CONTAINER SET 144

*FIG. 1*

SYNCHRONIZATION OF SENSOR NETWORK WITH ORGANIZATION ONTOLOGY HIERARCHY

BACKGROUND

The present application relates generally to an improved data processing apparatus and method and more specifically to an improved computing tool and improved computing tool operations/functionality for dynamic selection of artificial intelligence computer models to reduce costs and maximize user experience.

Ontology data structures are often used to represent a large collection of concepts, represented as data structures having various attributes defining the concept, and the relationships between these concepts indicating which concepts are linked to or otherwise related to each other. One definition of an ontology is a system of classes and relationships that described the structure of data, the rules that prescribe how a new category or entity is created, how attributes are defined, and how constraints are established. Ontology data structures are often used in artificial intelligence and machine learning to assist in the training and runtime operations of such computing systems by providing a body of knowledge upon which the computer models are trained and operate.

In addition, because ontology data structures represent concepts and their relationships which tends to result in a hierarchical structure, ontology data structures can also be used to represent parts of an organization hierarchy. For example, in information technology, ontologies can represent the computing devices, computing device functionalities, software executing on computing devices, organization departments and organization functionality, personnel, projects, and any other organization resource or concepts pertinent to operation of the organization, as one or more ontology data structures where nodes in the ontology data structures represent these organization concepts and links between nodes represent the relationships between these organization concepts.

Organizations also employ sensor networks to monitor the processes involved in performing the operations of the organization. A sensor network, often implemented as a wireless sensor network (WSN) is a distributed network of small embedded devices, called sensors, which communicate wirelessly following an ad hoc configuration, and one or more sink nodes, also known as base stations. The sensors of a sensor network are small, autonomous algorithms executing on electronic devices, electronic devices themselves, or the like, that sense characteristics of the performance of operations within the organization. These sensors may be associated with specific hardware, software, equipment, or the like. The sensors may measure various performance and environmental characteristics from temperature of an environment, to processor utilization, memory utilization, transactions per time period, bandwidth utilization, and the like. Sensors are required to send data to a sink when they detect the occurrence of events of interest. The sink may communicate with the end user via direct connections, the Internet, or wireless communications.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for synchronizing a sensor network with an organization ontology hierarchy. The method comprises obtaining an ontology data structure that specifies a hierarchy of operations of an organization. The ontology data structure comprises a plurality of nodes specifying concepts associated with operations of the organization, and edges connection nodes that represent relationships between the connected nodes. The method further comprises obtaining a sensor network representation, wherein the sensor network representation comprises elements representing sensors deployed to an infrastructure of the organization. In addition, the method comprises performing natural language processing on textual data associated with nodes of the ontology data structure and elements of the sensor network. Moreover, the method comprises mapping sensors of the sensor network to corresponding nodes in the ontology data structure based on results of the natural language processing. The method also comprises modifying at least one of the sensor network or the ontology data structure to align and synchronize the sensor network with the ontology data structure.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 1 is an example diagram of a distributed data processing system environment in which aspects of the illustrative embodiments may be implemented and at least some of the computer code involved in performing the inventive methods may be executed;

3

Figure 5:
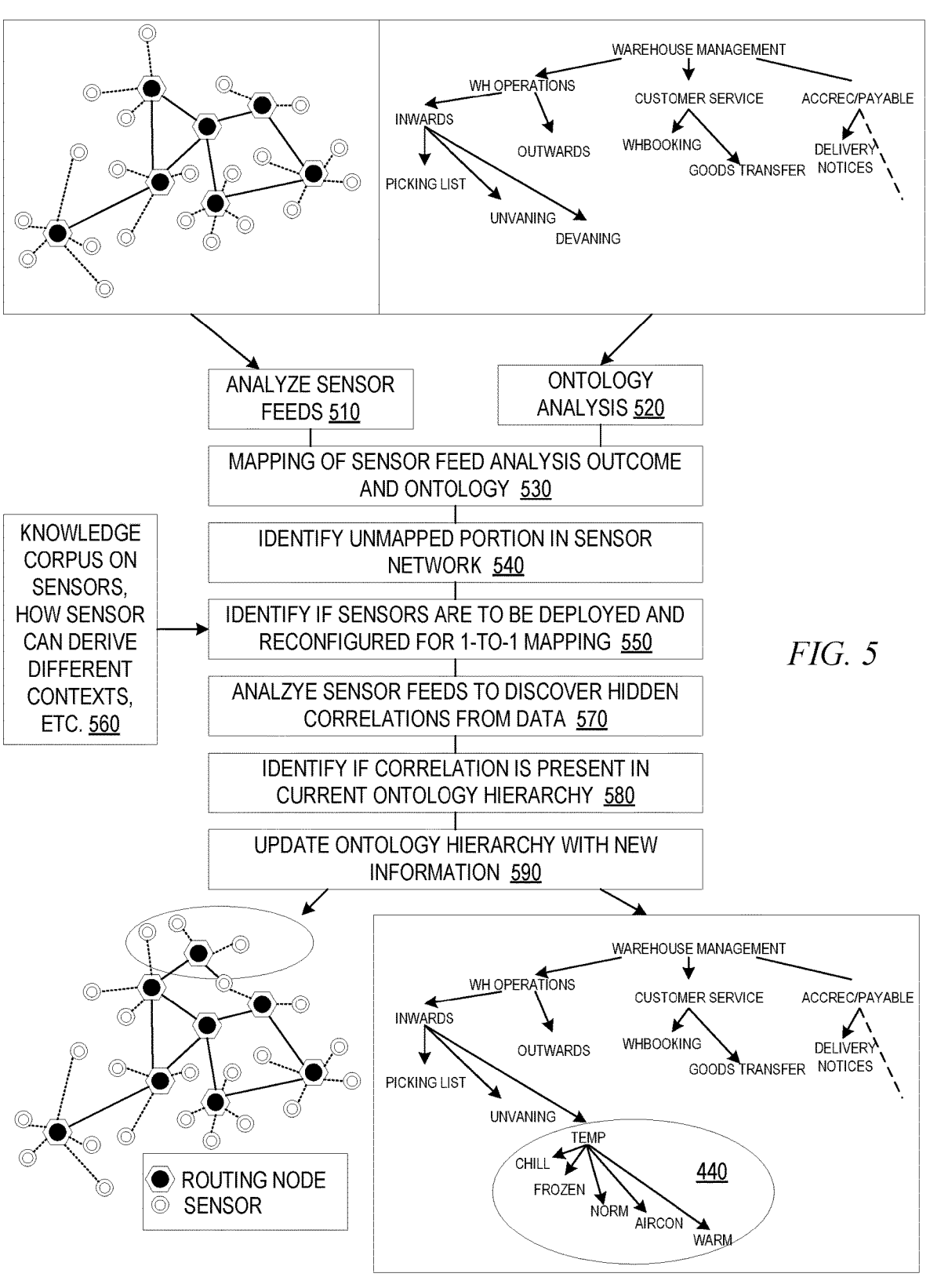

FIG. 5 is a flowchart outlining an example operation of a sensor network and organization ontology synchronization system in accordance with one illustrative embodiment.

DETAILED DESCRIPTION

The illustrative embodiments provide an improved computing tool and improved computing tool operations/functionality for synchronizing an organization sensor network with an organization ontology hierarchy. Sensor networks employed by an organization are considered separately from organization ontologies as they are directed to representing different aspects of the organization. That is, the sensor network is primarily concerned with monitoring the lower level operations of individual devices, systems, processes, environments, and the like. On the other hand, organization ontologies represent larger scale organization concepts of the model of the organization and how the organization operates. For example, concepts in an organization ontology data structure may specify concepts such as warehouse management, warehouse operations, incoming operations, picking list, customer service, goods transfers, and the like. Thus, these two mechanisms for representing the operation of an organization are separate and distinct from each other.

Organization ontologies may be used in formalizing organization rules and processes. For example, consider an ontology related to a "Library Management System." In this example, an ontology concept may be of the type "Book Loan Policy" with a process for determining "Loan Eligibility." In the Library Management System ontology, a rule may be formalized for determining a user's eligibility to borrow books as follows: If a library user is a registered member and their membership is in good standing (i.e., no outstanding fines or overdue books) and they have not reached their maximum borrowing limit, then they are eligible to borrow books. In this case, sensors (e.g., RFID Readers) on the shelves can detect the books and can detect when a book is taken out from the shelves and when a book is returned to shelves, etc.

These organization rules and processes may be formalized into logic implemented by systems of the organization, e.g., computing devices/systems, groupings of computing devices/systems (such as computing devices/systems associated with segments or departments of the organization), and the like. This helps to ensure that all of the systems of the organization agree with regard to the organization rules and processes that are to be followed.

The sensors of the sensor network are employed to capture various sources of data for analysis to evaluate the various organization processes with regard to potential issues with these processes, performance of the processes, and the like. However, the sensors of the sensor network and the organization ontology data structures are not always aligned. That is, because the sensor network and the organization ontology are independent of one another, in some cases, changes may be made to the sensor network which are not reflected in the organization ontology and vice versa, such that the two become misaligned and not synchronized with one another.

The illustrative embodiments operate to align the sensor network with the organization ontology and fill in any gaps in the sensor network and expand the organization ontology as needed to ensure alignment between the sensor network and organization ontology. The illustrative embodiments employ natural language (NLP) processing on sensor feeds from sensors of the sensor network, and sensor descriptions as may be provided by a sensor network knowledge corpus of the sensor network. These sensor feeds and sensor descriptions comprise natural language features, such as terms, phrases, concepts, which indicate the functionality of the sensors in the sensor network. The results of the NLP indicate key terms/phrases and concepts referenced in the sensor feeds and sensor descriptions which may be used for correlation purposes.

Similar NLP processing is performed on the attributes of nodes in the organization ontology so as identify key terms/phrases and concepts reference din the attributes of the ontology nodes. Based on these key terms/phrases, the sensors of the sensor network may be correlated with ontology nodes in the organization ontology hierarchy that reference similar key terms/phrases and concepts such that a mapping between sensors of the sensor network and nodes of the ontology data structure is generated. For example, by identifying key terms/phrases/concepts in the sensor feeds and ontology node attributes, sensors that monitor similar functionality as is provided by the ontology node may be identified and correlated.

Through this correlation, gaps in the sensor network may be identified and the sensor network may be automatically, or semi-automatically, updated to include additional sensors for ontology nodes that fall within the sensor network gap. These gaps may be portions of the organization ontology that do not have corresponding sensors in the sensor network. From the mapping, the types of sensors that would be needed for the portions of the ontology not covered by the sensor network may be identified for potential creation and deployment of sensors.

Similarly, areas of the sensor network that may not be represented in the organization ontology data structure may be identified and the ontology data structure expanded to include additional nodes and relationships. That is, portions of the ontology data structure that should be replicated to expand the ontology to align the ontology to the sensor network may be determined based on the mapping and the lack of organization ontology nodes for sensors in the sensor network. By mapping the sensor network to the organization ontology and modifying one or both to align the sensors of the sensor network with the organization nodes in the organization ontology, the sensor network and organization ontology data structure are synchronized such that sensors in the sensor network are correlated with the organization concepts represented by the nodes in the ontology data structure.

In some illustrative embodiments, the alignment of the sensor network with the organization ontology may include not only the sensor correlation based on the natural language processing discussed above, but may further use proximity information to generate virtual sensors from a combination of sensors in the sensor network and align the virtual sensors with organization ontology nodes. Proximity in this context may be logical proximity, such as in a logical ontology or organization of sensors, which may correlate, in some cases to a physical proximity as well. The organization ontology may evaluate the virtual sensor to determine if there are one or more organization ontology nodes, either alone or in combination, that have a similar proximity relationship to that of the virtual sensor and if so, align the virtual sensor with the identified ontology node(s). If the ontology does not have ontology nodes representing the proximity relationship, the ontology data structure may be updated to insert organization nodes that have the corresponding proximity relationship.

Thus, new data insights may be obtained from the sensor correlation and proximity that can be reflected in both the sensor network and the organization ontology data structure. That is, if N sensors are determined to be correlated by having a particular relationship and there is a short distance amongst them, a virtual sensor can be created by taking the values from the first sensors and applying a transformation function into a third data point or sensor. For example, as discussed above, humidity is correlated to a temperature increase and a pressure decrease and thus, if two sensors track temperature and pressure, respectively, a new third virtual sensor referenced as a humidity sensor can be auto- matically generated and added to the sensor network and aligned with the organization ontology data structure.

In some illustrative embodiments, the illustrative embodi- ments further determine semantic distances between exist- ing job roles, which may be defined in organization data structures for the organization and associated with the orga- nization's ontology, and the current organization ontology. The distances are used to create a mapping between job roles and the desired operating model. This mapping reveals to management which competencies have staffing surplus or deficit. The job role to organization ontology mapping generated based on this distance evaluation is compared against the sensor to organization ontology mapping gener- ated as previously described above. The mismatches uncov- ered via this comparison inform how the job roles can change to support the evolving organization operating model.

In some illustrative embodiments, multiple organization ontologies may be aligned and merged together based on similarity metrics. That is, for each level of the ontology, a word embedding may be generated for the different organi- zation ontologies, and a distance metric may be evaluated between corresponding levels of the ontologies. That is, the distance metric between paired word embeddings from the organization ontologies provides an edge score. Thus, for a given word embedding for a description of an organization node, distance metrics may be evaluated with word embed- dings of nodes in another organization ontology for a similar level. The closest concepts, i.e., organization ontology nodes, may then be identified based on the edge scores. Thereafter, the ontology data structure trees may be tra- versed from a root noted along a least expensive path, i.e., smallest edge scores, to a selected node. The paths from both the ontology trees can then be merged together into a joint ontology. For each pair of subontologies, the merging may be continued.

Thus, the illustrative embodiments provide an improved computing tool and improved computing tool operations/ functionality that correlates sensor networks of an organi- zation with the organization ontology data structure repre- senting the higher level concepts of the organization operation model. Through the correlations between sensor network and ontology data structure, areas of the sensor network that need to be updated and areas of the organiza- tion ontology that need to be updated to maintain alignment between the two may be automatically identified. Based on this identification, additional sensors may be automatically generated and deployed to the sensor network and expansion of the processes and higher level concepts of the organiza- tion ontology may be performed. Moreover, areas where sensors of the sensor network may be removed may also be identified. Thus, through this alignment hidden correlations among various functionaries may be identified, and the ontology hierarchy may be updated with the newly discov- ered correlations from the sensor network analysis where the identified correlations are not present in the existing ontol- ogy hierarchy. Moreover, based on these correlations, the illustrative embodiments are able to identify situations where additional ontology nodes need to be added to the ontology hierarchy, such as additional branches in the ontol- ogy hierarchy, as well as determine if there are any hierarchy level(s) that need to be updated, removed/disabled, or any cross-hierarchy level correlation is to be established. Based on the ontology hierarchy, and the correlation among the concepts in the ontology hierarchy with sensors in the sensor network, the sensors may be automatically realigned, auto- matically deployed, and automatically configured so that the sensors can capture the required data as per the ontology hierarchy.

Both the sensor network configuration and the organiza- tion ontology hierarchy are adapted and aligned with each other on a continuous basis, and any change in ontology hierarchy will be used as a basis for configuring the sensor network, and vice versa. In some cases, the correlation and mapping of the sensor network with the organization ontol- ogy may be used with mappings of personnel, in terms of their job roles, with the organization ontology so as to generate recommendations for realignment of personnel. In some cases, based on distance metrics associated with sensors of the sensor network and their relationships, virtual sensors that can be added to the sensor network may be automatically identified and generated, with alignment to the organization ontology hierarchy.

Before continuing the discussion of the various aspects of the illustrative embodiments and the improved computer operations performed by the illustrative embodiments, it should first be appreciated that throughout this description the term "mechanism" will be used to refer to elements of the present invention that perform various operations, func- tions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mecha- nism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illus- trative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular technological implementation for accomplishing and/or performing the actions, steps, processes, etc., attributable to and/or performed by the engine, but is limited in that the "engine" is implemented in computer technology and its actions, steps, processes, etc. are not performed as mental processes or performed through manual effort, even if the engine may work in conjunction with manual input or may provide output intended for manual or mental consumption. The engine is implemented as one or more of software executing on hardware, dedicated hardware, and/or firmware, or any combination thereof, that is specifically configured to perform the specified functions. The hardware may include, but is not limited to, use of a processor in combination with appropriate software loaded or stored in a machine readable memory and executed by the processor to thereby specifically configure the processor for a specialized purpose that comprises one or more of the functions of one or more embodiments of the present invention. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

It should be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

The present invention may be a specifically configured computing system, configured with hardware and/or software that is itself specifically configured to implement the particular mechanisms and functionality described herein, a method implemented by the specifically configured computing system, and/or a computer program product comprising software logic that is loaded into a computing system to specifically configure the computing system to implement the mechanisms and functionality described herein. Whether recited as a system, method, of computer program product, it should be appreciated that the illustrative embodiments described herein are specifically directed to an improved computing tool and the methodology implemented by this improved computing tool. In particular, the improved computing tool of the illustrative embodiments specifically provides a sensor network and organization ontology synchronization system. The improved computing tool implements mechanism and functionality, such as automated operations and functionality for aligning and synchronizing a sensor network of an organization with an organization ontology hierarchy, which cannot be practically performed by human beings either outside of, or with the assistance of, a technical environment, such as a mental process or the like. The improved computing tool provides a practical application of the methodology at least in that the improved computing tool is able to modify the sensor network of an organization and/or an organization ontology hierarchy that represents the higher level processes and inter-relationships of concepts of the functioning of the organization so as to align and synchronize the sensor network with the organization ontology hierarchy, which may involve automatically generating, deploying, and configuring additional sensors in the sensor network, automatically modifying the ontology structure to include additional ontology nodes and corresponding processes, and the like.

FIG. 1 is an example diagram of a distributed data processing system environment in which aspects of the illustrative embodiments may be implemented and at least some of the computer code involved in performing the inventive methods may be executed. That is, computing environment 100 contains an example of an environment for the execution of at least some of the computer code involved in performing the inventive methods, such as sensor network and organization ontology synchronization system 200. In addition to sensor network and organization ontology synchronization system 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and sensor network and organization ontology synchronization system 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in sensor network and organization ontology synchronization system 200 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in sensor network and organization ontology synchronization system 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

As shown in FIG. 1, one or more of the computing devices, e.g., computer 101 or remote server 104, may be specifically configured to implement a sensor network and organization ontology synchronization system 200. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as computing device 101 or remote server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates the alignment and synchronization of a sensor network of an organization with an organization ontology data structure representing the higher level processes and relationships within the organization that facilitate the operations of the organization.

Figure 2:
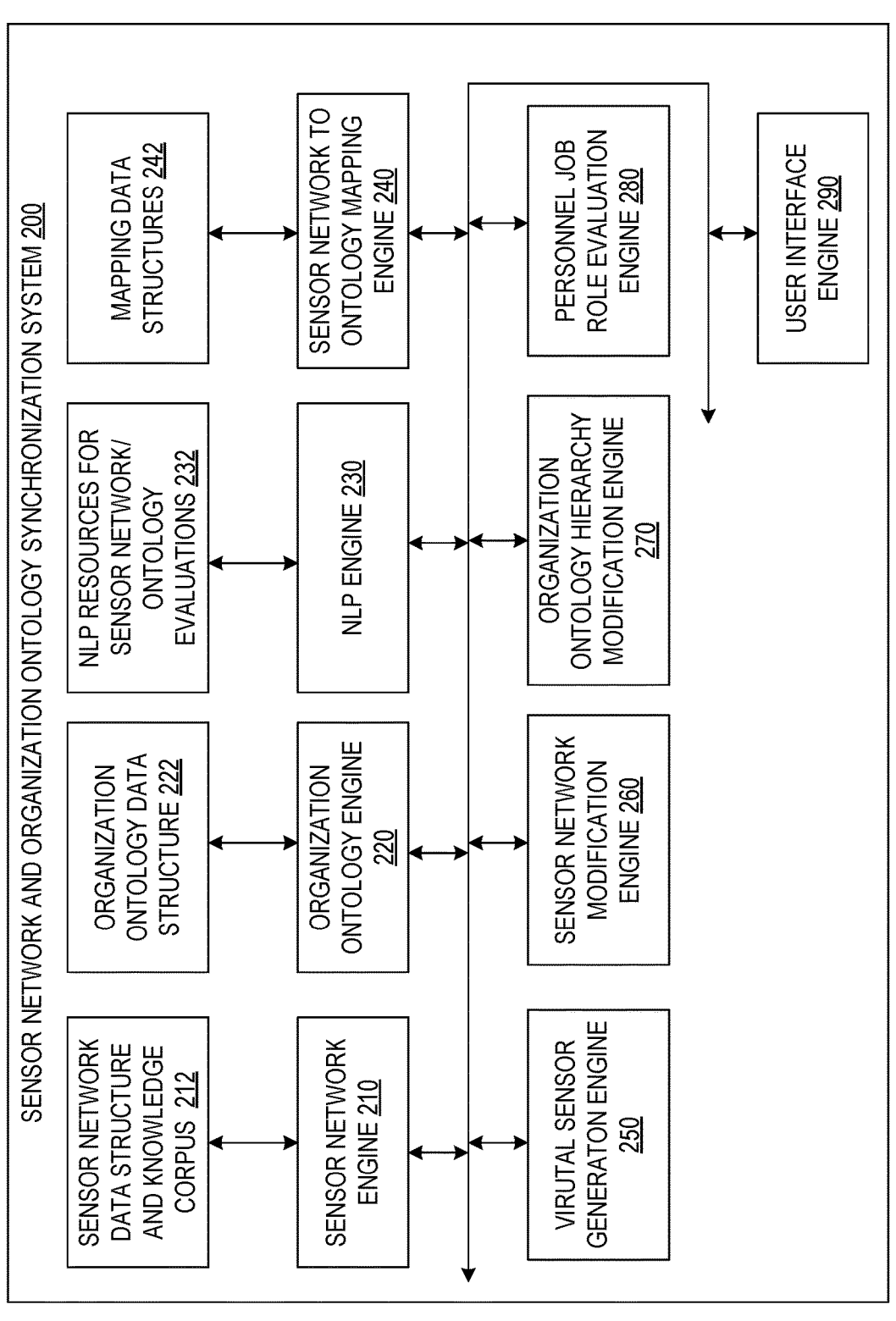
FIG. 2 is an example diagram of the primary operational components of a sensor network and organization ontology synchronization system in accordance with one illustrative embodiment.

FIG. 2 is an example diagram of the primary operational components of a sensor network and organization ontology synchronization system in accordance with one illustrative embodiment. The operational components shown in FIG. 2 may be implemented as dedicated computer hardware components, computer software executing on computer hardware which is then configured to perform the specific computer operations attributed to that component, or any combination of dedicated computer hardware and computer software configured computer hardware. It should be appreciated that these operational components perform the attributed operations automatically, without human intervention, even though inputs may be provided by human beings and the resulting output may aid human beings. The invention is specifically directed to the automatically operating computer components directed to improving the way sensor networks and organization processes are represented and operate in a synchronous manner through specific alignment and automated updated/modification of sensor network graphs and organization ontology data structures to be in alignment with one another. These operations cannot be practically performed by human beings as a mental process and are not directed to organizing any human activity.

As shown in FIG. 2, the sensor network and organization ontology synchronization system 200 includes a sensor network engine 210, an organization ontology engine 220, a natural language processing (NLP) engine 230, a sensor network to ontology mapping engine 240, a virtual sensor generation engine 250, a sensor network modification engine 260, an organization ontology hierarchy modification engine 270, a personnel job role evaluation engine 280, and a user interface engine 290. These operational elements operate based on, and update, various data structures 212, 222, 232, and 242. While these data structures are shown in FIG. 2 as being associated with particular ones of the operational components, it should be appreciated that interfaces and communication pathways may be provide for these data structures to be accessed by any of the operational components that may need access to these data structures to perform their corresponding operations and functionality.

The sensor network engine 210 comprising logic for receiving a sensor network data structure 212 representing the sensor network for an organization and analyze the sensor network data structure 212 to identify sensor gaps. The sensor network data structure 212 may further include a knowledge corpus that defines the various sensors of the sensor network and the functionalities they perform and descriptions of how those sensor may be utilized in different contexts within an organization. The knowledge corpus of the sensor network data structure 212 provides information for determining which sensors provide functionalities that correlate to functionalities that organization ontology nodes provide in an organization ontology hierarchy.

The organization ontology engine 220 comprises logic for receiving the organization ontology data structure 222 representing the operational concepts and processes for operating the organization and analyze the ontology data structure 222 to identify areas where the ontology data structure 222 may be extended based on an alignment with the sensor network. The ontology data structure may comprise nodes that represent the various operational concepts, processes, departments, personnel, and the like, that represent aspects of the operation of the organization, which are collectively referred to herein as operational concepts. Edges between these nodes represent relationships or dependencies between these operational concepts.

The natural language processing (NLP) engine 230 comprises logic for performing computer natural language processing of textual data. The NLP engine 230 is specifically configured with, and utilizes, NLP resources 232 that are specifically directed to the analysis and extraction of entities, key terms/phrases, and the like, collectively referred to as textual features, from textual descriptions associated with sensors of a sensor network and operational concepts of an organization ontology data structure. The NLP engine 230 may operate to parse and analyze textual descriptions of sensors in the sensor network data structure 212 and nodes in the organization ontology data structure 22 to extract the textual features. The NLP engine 230 may also operate to parse and analyze textual representations of the data generated by the sensors in the sensor network, such as summary text that summarizes the data being received from the sensors. These textual features may then be the basis of further analysis to identify correlations between sensors of the sensor network and operational concepts (nodes) in the organization ontology data structure 222.

The sensor network to ontology mapping engine 240 comprises logic that operates to identify similarities in textual features extracted from descriptions of sensors in the sensor network and textual features extracted from descriptions of ontology nodes to thereby correlate sensors with ontology nodes. The sensor network to ontology mapping engine 240 then generates one or more mapping data structures 242 that map sensors to ontology nodes. It should be appreciated that not all sensors may be mapped to ontology nodes and not all ontology nodes map to sensors. Thus, gaps may be identified.

The virtual sensor generation engine 250 operates to identify proximities between sensors and correlations between sensors based on defined relationships where sensors may be combined to generate other sensors. In such cases, the virtual sensor generation engine 250 comprises logic to generate virtual sensors that represent the combination of sensors and correlates the virtual sensor with one or more nodes in the ontology data structure if possible. As a result, virtual sensors may be correlated with nodes and added to the sensor network, and deployed to monitor additional data of the operations of the organization that may not be monitored by the existing sensor network.

The sensor network modification engine 260 comprises logic for modifying the sensor network by adding, removing, or modifying sensors in the sensor network based on a determined alignment of the sensor network data structure 212 and the organization ontology data structure 222. That is, additional sensors may be added to the sensor network 212 that have functionality matching the functionality of nodes in the ontology data structure 222 where gaps in the sensor network are determined to be present. Virtual sensors may likewise be added to the sensor network 212 when desired. Moreover, in cases where sensors exist in the sensor network but have no correlation with nodes in the ontology data structure, the sensors may be removed or the ontology data structure may be expanded depending on the desired implementation.

The organization ontology hierarchy modification engine 270 provides logic for modifying the ontology data structure 222 to expand the ontology data structure 222 in response to operations for aligning the ontology data structure 222 with the sensor network 212. Areas where the ontology data structure does not have nodes matching the functionality of the sensors in the sensor network may be identified and corresponding ontology nodes added that match the functionality of the sensors in the sensor network 212, which may include adding branches to the ontology data structure 222.

The personnel job role evaluation engine 280 provides logic for analyzing job roles of personnel associated with nodes in the ontology data structure to determine alignment of the job roles with sensors in the sensor network and nodes in the ontology data structure. This alignment may involve invoking the NLP engine 230 to perform textual feature extraction on descriptions of the job roles and correlating the extracted textual features with the textual features extracted from the sensor network 212 and organization ontology data structure 222.

The user interface engine 290 provides logic for presenting user interfaces to users to inform them of the modifications and alignment of the sensor network 212 with the ontology data structure 222 and provides user interface elements through which authorized users may authorize or deny modifications to one or both of the sensor network 212 or the ontology data structure 222.

These elements of the sensor network and organization ontology synchronization system 200 operate to synchronize an organization sensor network with an organization ontology hierarchy. Based on the synchronization, gaps in the sensor network, or areas of the organization ontology hierarchy that do not have correlations with sensors in the sensor network may be identified and these gaps may be addressed through modification of one or both, i.e., the system 200 operates to fill in any gaps in the sensor network and expand the organization ontology as needed to ensure alignment between the sensor network and organization ontology. The system 200 may operate dynamically either continuously or specifically in response to an event, such as a modification to one or both of a sensor network 212 or the organization ontology data structure 222.

The illustrative embodiments employ natural language (NLP) processing by the NLP engine 230 on the sensor feeds from sensors of the sensor network 212 as may be received by the sensor network engine 210. Moreover, the sensor network engine 210 may retrieve sensor descriptions from a sensor network knowledge corpus in the sensor network data structure 212. These sensor feeds and sensor descriptions comprise natural language features, such as terms, phrases, concepts, etc. (textual features) which indicate the functionality of the corresponding sensors in the sensor network. The results of the NLP operations by the NLP engine indicate key terms/phrases and concepts, i.e., textual features, that are referenced in the sensor feeds and sensor descriptions which may be used for correlation purposes.

Similar NLP processing is performed by the NLP engine 230 on the attributes of nodes in the organization ontology data structure 222 so as identify key terms/phrases and concepts, i.e., textual features, referenced in the attributes of the ontology nodes. Again, these may represent functionalities associated with those nodes that may be correlated with the functionalities of the sensors in the sensor network 212. Based on these extracted textual features, the sensors of the sensor network 212 may be correlated with ontology nodes in the organization ontology data structure 222 that reference similar key terms/phrases and concepts. That is, a vector similarity between vector embeddings of the extracted textual features of the sensors and the extracted textual features of the nodes in the ontology may be calculated by the sensor network to ontology mapping engine 240 using various similarity metrics, e.g., cosine similarity or the like. The similarity metric may be compared to a threshold or a closest similarity may be determined to identify which sensors and nodes correlate with one another. Based on these correlations, the sensor network to ontology mapping engine 240 may generate a mapping between sensors of the sensor network 212 and nodes of the ontology data structure 222 and may maintain that mapping data structure 242 for use in aligning the sensor network with the ontology hierarchy. For example, by identifying textual features in the sensor feeds and ontology node attributes, embedding them as vectors using word embedding logic or the like, and calculating vector similarity measures between the vectors, sensors that monitor similar functionality as is provided by a corresponding ontology node may be identified and correlated.

Through this correlation, the sensor network modification engine 260 may identify gaps in the sensor network 212 and the sensor network 212 may be automatically, or semi-automatically, updated to include additional sensors for ontology nodes that fall within the sensor network gap. These gaps may be portions of the organization ontology data structure 222 that do not have corresponding sensors in the sensor network 212, for example. From the mapping data structure 242, the types of sensors that would be needed for the portions of the ontology 222 not covered by the sensor network 212 may be identified for potential creation and deployment of sensors.

Similarly, areas of the sensor network 212 that may not be represented in the organization ontology data structure 222 may be identified by the organization ontology hierarchy modification engine 270, and the ontology data structure 222 may be expanded to include additional nodes and relationships. That is, portions of the ontology data structure 222 that should be replicated to expand the ontology to align the ontology 222 to the sensor network 212 may be determined by the organization ontology hierarchy modification engine 270 based on the mapping data structures 242 and the lack of organization ontology nodes for sensors in the sensor network 212. By mapping the sensor network 212 to the organization ontology data structure 222 and modifying one or both to align the sensors of the sensor network 212 with the organization nodes in the organization ontology data structure 222, the sensor network 212 and organization ontology data structure 222 are synchronized.

In some illustrative embodiments, the alignment of the sensor network 212 with the organization ontology data structure 222 may include not only the sensor correlation based on the natural language processing by the NLP engine 230 discussed above, but may further invoke the virtual sensor generation engine 250 to use proximity information to generate virtual sensors from a combination of sensors in the sensor network 212 and align the virtual sensors with organization ontology nodes in the ontology data structure 222. The virtual sensor generation engine 250 may further analyze the organization ontology data structure 222 to determine if there are one or more organization ontology nodes, either alone or in combination, that have a similar proximity relationship to that of the virtual sensor and if so, align the virtual sensor with the identified ontology node(s). If the ontology data structure 222 does not have ontology nodes representing the proximity relationship, the ontology data structure 222 may be updated by the organization ontology hierarchy modification engine 270 to insert organization nodes that have the corresponding proximity relationship.

Thus, new data insights may be obtained from the sensor correlation and proximity that can be reflected in both the sensor network 212 and the organization ontology data structure 222. That is, if N sensors are determined to be correlated by having a particular relationship and there is a short distance amongst them, a virtual sensor can be created by taking the values from the first sensors and applying a transformation function into a third data point or sensor. For example, as discussed above, humidity is correlated to a temperature increase and a pressure decrease and thus, if two sensors track temperature and pressure, respectively, a new third virtual sensor referenced as a humidity sensor can be automatically generated and added to the sensor network 212 and aligned with the organization ontology data structure 222.

In some illustrative embodiments, the illustrative embodiments further determine semantic distances between existing job roles and the current organization ontology. The distances are used to create a mapping between job roles and the desired operating model. This mapping reveals to management which competencies have staffing surplus or deficit. The job role to organization ontology mapping generated based on this distance evaluation, which may be stored as one of the mapping data structures 242, is compared against the sensor to organization ontology mapping data structure 242 generated as previously described above. The mismatches uncovered via this comparison, which may be performed by the personnel job role evaluation engine 280, informs how the job roles can change to support the evolving organization operating model represented in the ontology data structure 222.

In some illustrative embodiments, multiple organization ontology data structures 222 may be aligned and merged together based on similarity metrics. That is, for each level of the ontology, a word embedding may be generated for the different organization ontologies, and a distance metric may be evaluated between corresponding levels of the ontologies. That is, the distance metric between paired word embeddings from the organization ontologies provides an edge score. Thus, for a given word embedding for a description of an organization node, distance metrics may be evaluated with word embeddings of nodes in another organization ontology for a similar level. The closest concepts, i.e., organization ontology nodes, may then be identified based on the edge scores. Thereafter, the ontology data structure trees may be traversed from a root noted along a least expensive path, i.e., smallest edge scores, to a selected node. The paths from both the ontology trees can then be merged together into a joint ontology. For each pair of subontologies, the merging may be continued.

The user interface engine 290 may operate to present results of these operations to authorized users and obtain user input to authorize modifications and initiate operations for performing the alignment and synchronization of the sensor network 212 with the organization ontology data structure 222. The user interface may present graphical representations of the sensor network 212 and the organization ontology data structure 222. These graphical representations may include designations of portions of the sensor network 212 that are determined to be sensor gaps, that have been modified or are recommended to be modified, and the modifications that were performed or are recommended to be perform. Similar representations for the organization ontology data structure 222 may also be provided. In this way, the authorized user may visualize the sensor gaps, the recommended or performed modifications, and the like, for authorization and/or information purposes.

Hence, in accordance with at least one illustrative embodiment, the at least one illustrative embodiment provides the specific improved computing tool and improved computing tool functionality to align and synchronize a sensor network 212 with an organization ontology data structure 222, with one or more of the following considerations and capabilities:

1. There are different types of organization ontology hierarchies with the hierarchy being designed by the organization users or by analyzing various documents, contents, etc.
2. Each and every concept of the organization ontology is identified uniquely, and has associated metadata, such as a corresponding organization functionality, i.e., what that concept represents with regard to a functionality within the organization.
3. Each and every sensor in any sensor network is identified uniquely and has an associated description of their functionalities.
4. Based on usage information from the various sensors, the illustrative embodiments identify how different sensors are used to satisfy corresponding organization functionalities.
5. The natural language processing mechanisms of the illustrative embodiments analyze the sensor feeds to identify what types of organization functionalities are tracked with those sensors.
6. The natural language processing identifies each and every concept of the organization ontology hierarchy to identify how the organization functionalities are performed within the organization.
7. The illustrative embodiments create a mapping between the sensor network and organization ontology concepts based on the natural language processing performed on the textual data for the sensor feeds, sensor descriptions, node attributes of the organization ontology, etc.
8. The illustrative embodiments, based on the mappings generated, identify any gaps that may exist in the mapping between the sensor network and the ontology hierarchy.

9. The illustrative embodiments identify how the gaps, if any, correlate to missing or mismatches between sensors of the sensor network and different concepts in the ontology hierarchy and may identify new sensors to be added to the sensor network and/or expansions of the ontology hierarchy through the addition of new nodes or the like.

10. The illustrative embodiments validate, based on the identified gaps, whether the existing sensors are to be reconfigured or additional sensors are to be deployed to address the identified gaps.

11. The illustrative embodiments may leverage a knowledge corpus on how different sensors collectively gather sensor information for different organization functionalities to thereby identify sensors that may be added to the sensor network or sensors that can be reconfigured, or even the creation of virtual sensors through the combining of sensors to address identified gaps.

12. The illustrative embodiments identify what types of additional sensors are required so that the analyzed sensor feeds can be directly mapped to the ontology hierarchy of the organization.

13. The illustrative embodiments implement one or more analysis engines that analyze the sensor feeds and, with machine learning models and the like, discover various correlations with the sensor feeds.

14. The illustrative embodiments use sensor correlation and proximity to identify virtual sensors based off multiple sensor data and correlate such virtual sensors with relationships in the organization ontology.

15. The illustrative embodiments identify whether the ontology hierarchy has those relationship defined.

16. The illustrative embodiments identify if new hierarchical relationships among various nodes and/or attributes of nodes are discovered from the sensor analysis.

17. The illustrative embodiments implement functionality to update the ontology hierarchy, such as by adding new levels in the hierarchy, new relationships with the concepts of the ontology, or the like.

18. The illustrative embodiments align the analyzed feeds from the sensor network with the ontology hierarchy.

19. The data generation pattern from the sensor network is controlled by the configurations of the sensors.

20. If any changes are identified in the ontology hierarchy, then the illustrative embodiments update the sensor network configuration accordingly, and if there are any changes to the sensor network, the ontology hierarchy may be updated accordingly.

21. In some illustrative embodiments, semantic distances are determined between existing job roles and the current organization ontology, where the distances are used to create a mapping between job roles and the desired operating model, which reveals which competencies have staffing surplus or deficits.

22. In some illustrative embodiments, the job role to organization ontology mapping may be compared against the sensor to organization ontology mapping to identify any mismatches between these mappings which may be used to generate notifications to inform how the job roles can change to support the evolving organization operating model.

Thus, the illustrative embodiments provide an improved computing tool and improved computing tool operations/functionality that correlates sensor networks of an organization with the organization ontology data structure representing the higher level concepts of the organization operation model. Through the correlations between sensor network and ontology data structure, areas of the sensor network that need to be updated and areas of the organization ontology that need to be updated to maintain alignment between the two may be automatically identified. Based on this identification, additional sensors may be automatically generated and deployed to the sensor network and expansion of the processes and higher level concepts of the organization ontology may be performed. Moreover, areas where sensors of the sensor network may be removed may also be identified. Thus, through this alignment hidden correlations among various functionaries may be identified, and the ontology hierarchy may be updated with the newly discovered correlations from the sensor network analysis where the identified correlations are not present in the existing ontology hierarchy. Moreover, based on these correlations, the illustrative embodiments are able to identify situations where additional ontology nodes need to be added to the ontology hierarchy, such as additional branches in the ontology hierarchy, as well as determine if there are any hierarchy level(s) that need to be updated, removed/disabled, or any cross-hierarchy level correlation is to be established. Based on the ontology hierarchy, and the correlation among the concepts in the ontology hierarchy with sensors in the sensor network, the sensors may be automatically realigned, automatically deployed, and automatically configured so that the sensors can capture the required data as per the ontology hierarchy.

Both the sensor network configuration and the organization ontology hierarchy are adapted and aligned with each other on a continuous basis, and any change in ontology hierarchy will be used as a basis for configuring the sensor network, and vice versa. In some cases, the correlation and mapping of the sensor network with the organization ontology may be used with mappings of personnel, in terms of their job roles, with the organization ontology so as to generate recommendations for realignment of personnel. In some cases, based on distance metrics associated with sensors of the sensor network and their relationships, virtual sensors that can be added to the sensor network may be automatically identified and generated, with alignment to the organization ontology hierarchy.

As noted above, the mechanisms of the illustrative embodiments operate to align and synchronize the sensor network with the organization ontology data structure. In performing this alignment and synchronization, sensor gaps and modifications to the sensor network and/or organization ontology data structure may be performed to implement this alignment.

Figure 3:
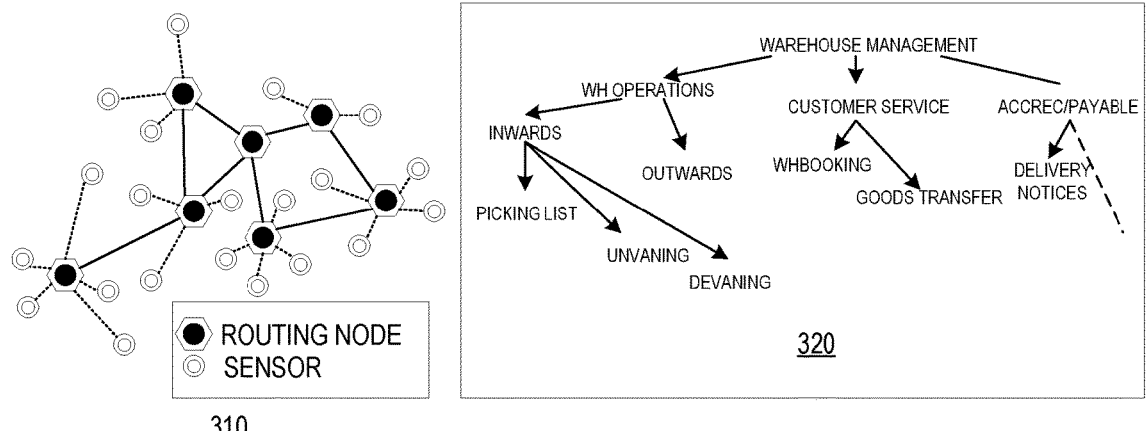
FIG. 3 illustrates an example of a sensor network and organization ontology in accordance with one illustrative embodiment.
Figure 4:
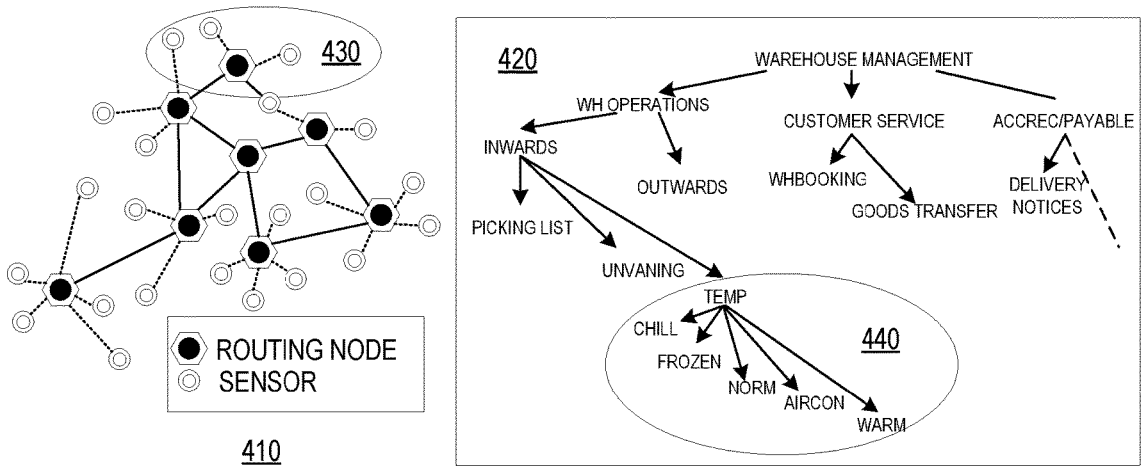
FIG. 4 illustrates an updated sensor network and organization ontology that are synchronized in accordance with one illustrative embodiment.

FIG. 3 illustrates an example of a sensor network and organization ontology in accordance with one illustrative embodiment. FIG. 4 illustrates an updated sensor network and organization ontology that are aligned and synchronized in accordance with one illustrative embodiment. As shown in FIG. 3, the sensor network 310 comprises routing nodes and sensor nodes that are connected to each other by communication pathways. The organization ontology data structure 320 comprise a plurality of concepts connected by edges as previously described above.

In FIG. 4, after operation of the illustrative embodiments, it is shown that the sensor network 410 has been modified from FIG. 3 to include a set of additional sensor and routing nodes 430. Moreover, the ontology data structure 420 includes a portion of the ontology that has been expanded by adding an additional branch of concepts and edges 440.

FIG. 5 is a flowchart outlining an example operation of a sensor network and organization ontology synchronization system in accordance with one illustrative embodiment. It should be appreciated that the operations outlined in FIG. 5 are specifically performed automatically by an improved computer tool of the illustrative embodiments and are not intended to be, and cannot practically be, performed by human beings either as mental processes or by organizing human activity. To the contrary, while human beings may, in some cases, initiate the performance of the operations set forth in FIG. 5, and may, in some cases, make use of the results generated as a consequence of the operations set forth in FIG. 5, the operations in FIG. 5 themselves are specifically performed by the improved computing tool in an automated manner.

As shown in FIG. 5, the operation starts by receiving and analyzing the sensor feeds and textual descriptions of the sensors in the sensor network (step 510). In addition, the organization ontology is received and analyzed (step 520). These analysis operations may include performing NLP operations on the sensor feeds and textual descriptions of sensors and ontology nodes to extract textual features indicative of the functionalities of the sensors and the ontology nodes, for example.

Based on the textual feature extraction and analysis performed in steps 510-520, a mapping of sensors to nodes in the organization ontology data structure is generated (step 530). The unmapped portions of the sensor network are identified as sensor gaps (step 540) and a determination is made as to which, if any, sensors are to be created, deployed, and configured for a one-to-one mapping of sensors with nodes in the ontology to fill the sensor gap(s) (step 550). The knowledge corpus for the sensors may be input (step 560) to specify how the sensors perform functions similar to functions associated with nodes in the ontology data structure to thereby identify which sensors will perform the functionalities of the ontology nodes that do not have sensors in the sensor network.

In addition, the mapping of sensors to nodes in the ontology may be further analyzed to identify hidden correlations (step 570). Based on the identification of hidden correlations, the ontology data structure is analyzed to determine if these correlations are already present in the current ontology hierarchy (step 580). The ontology hierarchy is then updated with new information. The operation then terminates.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, in a data processing system, for synchronizing a sensor network with an organization ontology hierarchy, the computer-implemented method comprising:

obtaining an ontology data structure that specifies a hierarchy of operations of an organization, wherein
the ontology data structure comprises nodes specifying concepts associated with the operations of the organization, and edges connecting the nodes, and
the edges represent relationships between the nodes;
obtaining a sensor network representation, wherein the sensor network associated with the sensor network representation comprises elements representing sensors deployed to an infrastructure of the organization;
performing natural language processing on textual data associated with the nodes of the ontology data structure and the elements of the sensor network;
mapping the sensors of the sensor network to respective ones of the nodes in the ontology data structure based on results of the natural language processing;
identifying, based on the mapping, at least one gap in the sensor network or the ontology data structure, wherein the at least one gap comprises at least one of a portion of the ontology data structure that does not have corresponding sensor in the sensor network, or a sensor in the sensor network for which there is not a corresponding portion of the ontology data structure; and
modifying, based on the identifying of the at least one gap, at least one of the sensor network or the ontology data structure to align and synchronize the sensor network with the ontology data structure, wherein the modifying of the at least one of the sensor network or the ontology data structure comprises updating the sensor network to include at least one additional sensor corresponding to the at least one gap and automatically configuring the at least one additional sensor.

2. The computer-implemented method of claim 1, wherein the textual data associated with the elements of the sensor network comprises textual data in sensor feeds from the sensors of the sensor network and sensor descriptions provided in a sensor network knowledge corpus of the sensor network.

3. The computer-implemented method of claim 1, wherein the textual data associated with the ontology data structure comprises attributes of the nodes in the ontology data structure.

4. The computer-implemented method of claim 1, wherein the mapping of the sensors to the respective ones of the nodes in the ontology data structure comprises:
correlating first terms or phrases extracted from the textual data associated with the nodes of the ontology data structure by the natural language processing, with corresponding second terms or phrases extracted from the textual data associated with the elements of the sensor network; and
mapping, based on the correlating, at least one first element of the sensor network, that is associated with a second term or phrase of the second terms or the phrases, with at least one corresponding node of the ontology data structure that is associated with a corresponding first term or phrase of the first terms or the phrases.

5. The computer-implemented method of claim 1, wherein the modifying of the at least one of the sensor network or the ontology data structure to align and synchronize the sensor network with the ontology data structure further comprises expanding the ontology data structure to include additional nodes and relationships.

6. The computer-implemented method of claim 1, wherein the mapping of the sensors of the sensor network to the respective ones of the nodes in the ontology data structure based on the results of the natural language processing comprises:

processing proximity information of the sensors in the sensor network to generate one or more virtual sensors, from a combination of sensors that are within a given proximity of each other; and correlating the one or more virtual sensors with the one or more portions of the ontology data structure to identify the at least one gap in the sensor network or the ontology data structure.

7. The computer-implemented method of claim 1, further comprising:

determining, based on the natural language processing, semantic distances between job roles and the nodes in the ontology data structure to create a mapping between the job roles and a desired operating model; and comparing the mapping between the job roles and the desired operating model with the mapping between the sensor network and the ontology data structure to determine a discrepancy.

8. The computer-implemented method of claim 1, further comprising merging organization data structures for a plurality of organizations based on the results of the natural language processing and a similarity metric evaluation between nodes of ontology data structures of the plurality of organizations, wherein the plurality of organizations includes the organization.

9. A computer program product comprising a computer readable storage medium having a computer readable program stored therein, wherein the computer readable program, when executed on a computing device, causes the computing device to:

obtain an ontology data structure that specifies a hierarchy of operations of an organization, wherein the ontology data structure comprises nodes specifying concepts associated with the operations of the organization, and edges connecting the nodes, and the edges represent relationships between the nodes;

obtain a sensor network representation associated with a sensor network, wherein the sensor network associated with the sensor network representation comprises elements representing sensors deployed to an infrastructure of the organization;

perform natural language processing on textual data associated with the nodes of the ontology data structure and the elements of the sensor network;

map the sensors of the sensor network to respective ones of the nodes in the ontology data structure based on results of the natural language processing;

identify, based on the mapping, at least one gap in the sensor network or the ontology data structure, wherein the at least one gap comprises at least one of a portion of the ontology data structure that does not have corresponding sensor in the sensor network, or a sensor in the sensor network for which there is not a corresponding portion of the ontology data structure; and modify, based on the identification of the at least one gap, at least one of the sensor network or the ontology data structure to align and synchronize the sensor network with the ontology data structure, wherein the modifying of the at least one of the sensor network or the ontology data structure comprises updating the sensor network to include at least one additional sensor corresponding to the at least one gap and automatically configuring the at least one additional sensor.

10. The computer program product of claim 9, wherein the textual data associated with the elements of the sensor network comprises textual data in sensor feeds from the sensors of the sensor network and sensor descriptions provided in a sensor network knowledge corpus of the sensor network.

11. The computer program product of claim 9, wherein the textual data associated with the ontology data structure comprises attributes of the nodes in the ontology data structure.

12. The computer program product of claim 9, wherein the mapping of the sensors to the respective ones of the nodes in the ontology data structure comprises;

correlating first terms or phrases extracted from the textual data associated with the nodes of the ontology data structure by the natural language processing, with corresponding second terms or phrases extracted from the textual data associated with the elements of the sensor network; and mapping, based on the correlating, at least one first element of the sensor network, that is associated with a second term or phrase of the second terms or the phrases, with at least one corresponding node of the ontology data structure that is associated with a corresponding first term or phrase of the first terms or the phrases.

13. The computer program product of claim 9, wherein the modifying of the at least one of the sensor network or the ontology data structure to align and synchronize the sensor network with the ontology data structure further comprises expanding the ontology data structure to include additional nodes and relationships.

14. The computer program product of claim 9, wherein the mapping of the sensors to the respective ones of the nodes in the ontology data structure based on the results of the natural language processing comprises:

processing proximity information of the sensors in the sensor network to generate one or more virtual sensors, from a combination of sensors that are within a given proximity of each other; and correlating the one or more virtual sensors with the one or more portions of the ontology data structure to identify the at least one gap in the sensor network or the ontology data structure.

15. The computer program product of claim 9, further comprising:

determining, based on the natural language processing, semantic distances between job roles and the nodes in the ontology data structure to create a mapping between the job roles and a desired operating model; and comparing the mapping between the job roles and the desired operating model with the mapping between the sensor network and the ontology data structure to determine a discrepancy.

16. An apparatus, comprising:

at least one processor; and at least one memory coupled to the at least one processor, wherein the at least one memory comprises instructions which, when executed by the at least one processor, cause the at least one processor to:

obtain an ontology data structure that specifies a hierarchy of operations of an organization, wherein the ontology data structure comprises nodes specifying concepts associated with the operations of the organization, and edges that connect the nodes, and the edges represent relationships between the nodes;

obtain a sensor network representation associated with
a sensor network, wherein the sensor network asso-
ciated with the sensor network representation com-
prises elements representing sensors deployed to an
infrastructure of the organization;
perform natural language processing on textual data
associated with the nodes of the ontology data struc-
ture and the elements of the sensor network;
map the sensors of the sensor network to respective
ones of the nodes in the ontology data structure
based on results of the natural language processing;
identify, based on the mapping, at least one gap in the
sensor network or the ontology data structure,
wherein the at least one gap comprises at least one of
a portion of the ontology data structure that does not
have corresponding sensor in the sensor network, or
a sensor in the sensor network for which there is not
a corresponding portion of the ontology data struc-
ture; and
modify, based on the identification of the at least one
gap, at least one of the sensor network or the
ontology data structure to align and synchronize the
sensor network with the ontology data structure,
wherein the modification of the at least one of the
sensor network or the ontology data structure com-
prises updating the sensor network to include at least
one additional sensor corresponding to the at least
one gap and automatically configuring the at least
one additional sensor.

* * * * *

26